US009642047B2

(12) United States Patent
Kim et al.

(10) Patent No.: US 9,642,047 B2
(45) Date of Patent: May 2, 2017

(54) APPARATUS AND METHOD FOR PERFORMING HANDOVER IN RADIO LOCAL ACCESS NETWORK COMMUNICATION SYSTEM

(71) Applicant: Samsung Electronics Co., Ltd., Suwon-si, Gyeonggi-do (KR)

(72) Inventors: Gyou-Hwan Kim, Suwon-si (KR); Woon-Kyun Lee, Hwaseong-si (KR); Han-Seok Kim, Seoul (KR); Kwang-Seon Yoo, Seongnam-si (KR); Won-Seok Choi, Seoul (KR); Kyung-Wan Han, Seongnam-si (KR); Young-Jip Kim, Hwaseong-si (KR); Sang-Yeon Won, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 14/364,952

(22) PCT Filed: Dec. 21, 2012

(86) PCT No.: PCT/KR2012/011269
§ 371 (c)(1),
(2) Date: Jun. 12, 2014

(87) PCT Pub. No.: WO2013/095043
PCT Pub. Date: Jun. 27, 2013

(65) Prior Publication Data
US 2014/0334447 A1    Nov. 13, 2014

(30) Foreign Application Priority Data
Dec. 23, 2011  (KR) ........................ 10-2011-0141666

(51) Int. Cl.
H04W 4/00 (2009.01)
H04W 36/00 (2009.01)
H04W 36/08 (2009.01)

(52) U.S. Cl.
CPC ........ H04W 36/0055 (2013.01); H04W 36/08 (2013.01)

(58) Field of Classification Search
CPC .................................................... H04W 80/04
(Continued)

(56) References Cited

U.S. PATENT DOCUMENTS

2004/0121772 A1   6/2004  Rue
2004/0137905 A1   7/2004  Jeong et al.
(Continued)

FOREIGN PATENT DOCUMENTS

EP   1 760 947 A2   3/2007
EP   1 760 947 A3   9/2011

OTHER PUBLICATIONS

Kim et al., Selective Channel Scanning for Fast Handoff in Wireless LAN Using Neighbor Graph, The 2004 International Technical Conference on Circuits/Systems, Computers and Communications (ITC-CSCC2004), Jul. 6-8, 2004, pp. 1-4, XP-002321627.
(Continued)

*Primary Examiner* — Christopher R Crompton
(74) *Attorney, Agent, or Firm* — Jefferson IP Law, LLP (57) ABSTRACT

Provided is a method for performing handover by a STAtion (STA) in a radio Local Access Network (LAN) communication system. The method includes sending a Network Controlled HandOver Setup Request Information Element (Ncho Setup Req IE) message indicating that the STA is to perform a scan operation using a controlled scan scheme, to a serving Access Point (AP); receiving a Network Controlled HandOver Setup Response Information Element
(Continued)

(Ncho Setup Rsp IE) message including a scan parameter related to a controlled scan operation of the STA, from the serving AP; and broadcasting a probe request message to the serving AP and neighbor APs over channels according to the scan parameter included in the Ncho Setup Rsp IE message.

20 Claims, 6 Drawing Sheets

(58) Field of Classification Search
USPC .......................................................... 370/331
See application file for complete search history.

(56) References Cited

U.S. PATENT DOCUMENTS

| | | |
|---|---|---|
| 2006/0153133 A1 | 7/2006 | Zhong |
| 2006/0159041 A1 | 7/2006 | Zhun |
| 2006/0209758 A1 | 9/2006 | Qiang et al. |
| 2006/0256763 A1 | 11/2006 | Nguyen et al. |
| 2006/0258350 A1 | 11/2006 | Roy et al. |
| 2007/0002811 A1 | 1/2007 | Faccin et al. |
| 2007/0206535 A1 | 9/2007 | Sood et al. |
| 2009/0190531 A1* | 7/2009 | Jetcheva ................. H04L 45/12 370/328 |
| 2010/0241854 A1 | 9/2010 | Yao et al. |
| 2010/0248715 A1 | 9/2010 | Lundsgaard et al. |

OTHER PUBLICATIONS

Kuijsten, The Network Beacon Announcement Scanning Method, IEEE 802.11-03/1380r0, Nov. 5, 2004, pp. 1-20, vol. 802.11r, XP017689988, IEEE-SA Mentor, Piscataway, NJ, USA.

Xi Chen et al., Hand: Fast Handoff with Null Dwell Time for IEEE 802.11 Networks, Aug. 2, 2010.

Ahmed Riadh Rebai et al., An Adaptive Multimedia-Oriented Handoff Scheme for IEEE 802.11 WLANS., vol. 3, No. 1, Feb. 2011.

Haitao Wu et al., Proactive Scan: Fast Handoff with Smart Triggers for 802.11 Wireless LAN, 2007.

Jin Teng et al., D-Scan: Enabling Fast and Smooth Handoffs in AP-dense 802.11 Wireless Networks., Apr. 19, 2009.

* cited by examiner

APPARATUS AND METHOD FOR PERFORMING HANDOVER IN RADIO LOCAL ACCESS NETWORK COMMUNICATION SYSTEM

PRIORITY

This application is a National Phase Entry of PCT International Application No. PCT/KR2012/011269, which was filed on Dec. 21, 2012, and claims a priority to Korean Patent Application No. 10-2011-0141666, which was filed on Dec. 23, 2011, the contents of which are incorporated herein by reference.

TECHNICAL FIELD

The present invention relates to an apparatus and method for performing handover in a radio Local Access Network (LAN) communication system.

BACKGROUND ART

The handover scheme used in radio LAN communication systems is a scheme in which a STAtion (STA) measures Received Signal Strength Indicators (RSSIs) by searching for its neighbor Access Points (APs) by itself, determines an AP to which it will perform handover, and then performs handover to the AP.

However, the STA performing handover needs to perform a scan operation for all channels because it cannot determine in which channels APs exist. Particularly, in an active scan scheme, if an STA broadcasts a probe request message over a channel and APs receiving the probe request message send a probe response message, then the STA measures RSSIs of the probe response messages received from the APs, and uses them in determining an AP to which it will perform handover.

A waiting time of tens of milliseconds (msec) is needed until an STA receives a probe response message after sending a probe request message in a process of scanning all channels to determine an AP to which it will perform handover as described above. The reason why the STA needs to wait for a waiting time of tens of milliseconds until it receives a probe response message after sending a probe request message in the channel scanning process is because the STA needs to prepare for the possible delay in a probe response message due to the channel contention between an AP and STAs, which is caused by the Carrier Sense Multiple Access/Collision Avoidance (CSMA/CA) characteristics of the radio LAC communication system.

As described above, the current radio LAN communication system uses the active scan scheme as its handover scheme, causing a time delay due to the channel scanning, and the time delay may cause an increase in the time required to determine handover.

In addition, an STA may suffer from an increase in packet delay time and a decrease in data throughput because the STA cannot exchange data with the AP (i.e., a serving AP), to which it is presently connected, while measuring an RSSI of an AP(s) operating in another channel.

Further, an STA may not determine whether the AP (i.e., a target AP), to which it will perform handover, can accommodate or cover the STA, because the STA performs handover after determining an AP to which it will perform handover. For example, while performing a Voice over Internet Protocol (VoIP) call, an STA may not perform Call Admission Control (CAC) in terms of the VoIP capacity of the target AP.

Moreover, since an STA determines a target AP and then performs handover thereto, its AP may not determine the handover start time of the STA. Therefore, the data may be lost, which was transmitted to the AP, to which the STA was connected before handover, until the STA starts an access to the target AP after performing handover.

DISCLOSURE OF INVENTION

Technical Problem

An aspect of exemplary embodiments of the present invention is to provide an apparatus and method for performing handover in a radio LAN communication system.

Another aspect of exemplary embodiments of the present invention is to provide a handover apparatus and method for minimizing the delay time required to determine to perform handover in a radio LAN communication system.

Further another aspect of exemplary embodiments of the present invention is to provide a handover apparatus and method for minimizing the packet delay time due to the execution of handover in a radio LAN communication system.

Yet another aspect of exemplary embodiments of the present invention is to provide a handover apparatus and method for minimizing the decrease in data throughput due to the execution of handover in a radio LAN communication system.

Still another aspect of exemplary embodiments of the present invention is to provide a handover apparatus and method capable of determining whether a target AP can accommodate an STA, in a radio LAN communication system.

Still another aspect of exemplary embodiments of the present invention is to provide a handover apparatus and method for allowing an Access Point Controller (APC) to determine a handover start time of an STA in a radio LAN communication system.

Solution to Problem

In accordance with one aspect of the present invention, there is provided a method for performing handover by a STAtion (STA) in a radio Local Access Network (LAN) communication system. The method includes sending a Network Controlled HandOver Setup Request Information Element (Ncho Setup Req IE) message indicating that the STA is to perform a scan operation using a controlled scan scheme, to a serving Access Point (AP); receiving a Network Controlled HandOver Setup Response Information Element (Ncho Setup Rsp IE) message including a scan parameter related to a controlled scan operation of the STA, from the serving AP; and broadcasting a probe request message to the serving AP and neighbor APs over channels according to the scan parameter included in the Ncho Setup Rsp IE message.

In accordance with another aspect of the present invention, there is provided a STAtion in a radio Local Access Network (LAN) communication system. The STA includes a transmitting unit; a receiving unit; and a control unit. The transmitting unit sends a Network Controlled HandOver Setup Request Information Element (Ncho Setup Req IE) message indicating that the STA is to perform a scan operation using a controlled scan scheme, to a serving Access Point (AP). The receiving unit receives a Network Controlled HandOver Setup Response Information Element (Ncho Setup Rsp IE) message including a scan parameter related to a controlled scan operation of the STA, from the serving AP. The transmitting unit broadcasts a probe request message to the serving AP and neighbor APs over channels according to the scan parameter included in the Ncho Setup Rsp IE message.

In accordance with further another aspect of the present invention, there is provided a method for performing handover by a serving Access Point (AP) in a radio Local Access Network (LAN) communication system. The method includes receiving a Network Controlled HandOver Setup Request Information Element (Ncho Setup Req IE) message indicating that a STAtion (STA) is to perform a scan operation using a controlled scan scheme, from the STA; sending the Ncho Setup Req IE message to an Access Point Controller (APC); receiving a Network Controlled HandOver Setup Response Information Element (Ncho Setup Rsp IE) message including a scan parameter related to a controlled scan operation of the STA, from the APC; sending the Ncho Setup Rsp IE message to the STA; measuring, upon receiving a probe request message from the STA, a Received Signal Strength Indicator (RSSI) of the probe request message; and sending a Scan Report Ind (STA) message including the measured RSSI to the APC.

In accordance with yet another aspect of the present invention, there is provided a serving Access Point (AP) in a radio Local Access Network (LAN) communication system. The serving AP includes a wired transmitting/receiving unit; a wireless transmitting/receiving unit; and a control unit. The wireless transmitting/receiving unit receives a Network Controlled HandOver Setup Request Information Element (Ncho Setup Req IE) message indicating that a STAtion (STA) is to perform a scan operation using a controlled scan scheme, from the STA. The wired transmitting/receiving unit sends the Ncho Setup Req IE message to an Access Point Controller (APC). The wired transmitting/receiving unit receives a Network Controlled HandOver Setup Response Information Element (Ncho Setup Rsp IE) message including a scan parameter related to a controlled scan operation of the STA, from the APC. The wireless transmitting/receiving unit sends the Ncho Setup Rsp IE message to the STA. If the wireless transmitting/receiving unit receives a probe request message from the STA, the control unit measures a Received Signal Strength Indicator (RSSI) of the probe request message. The wired transmitting/receiving unit sends a Scan Report Ind (STA) message including the measured RSSI to the APC.

In accordance with still another aspect of the present invention, there is provided a method for performing handover by a neighbor Access Point (AP) including a target AP in a radio Local Access Network (LAN) communication system. The method includes receiving a Scan Mode (controlled scan) message indicating that a STAtion (STA) is to perform a scan operation using a controlled scan scheme, from an Access Point Controller (APC); measuring, upon receiving a probe request message from the STA, measuring a Received Signal Strength Indicator (RSSI) of the probe request message; and sending a Scan Report Ind (STA) including the measured RSSI to the APC.

In accordance with still another aspect of the present invention, there is provided a neighbor Access Point (AP) including a target AP in a radio Local Access Network (LAN) communication system. The neighbor AP includes a receiving unit for receiving a Scan Mode (controlled scan) message indicating that a STAtion (STA) is to perform a scan operation using a controlled scan scheme, from an Access Point Controller (APC); a control unit for measuring, upon receiving a probe request message from the STA, a Received Signal Strength Indicator (RSSI) of the probe request message; and a transmitting unit for sending a Scan Report Ind (STA) message including the measured RSSI to the APC.

In accordance with still another aspect of the present invention, there is provided a method for performing handover by an Access Point Controller (APC) in a radio Local Access Network (LAN) communication system. The method include receiving a Network Controlled HandOver Setup Request Information Element (Ncho Setup Req IE) message indicating that a STAtion (STA) is to perform a scan operation using a controlled scan scheme, from a serving Access Point (AP); and sending a Network Controlled HandOver Setup Response Information Element (Ncho Setup Rsp IE) message including a scan parameter related to a controlled scan operation of the STA, to the serving AP.

In accordance with still another aspect of the present invention, there is provided an Access Point Controller (APC) in a radio Local Access Network (LAN) communication system. The APC includes a transmitting unit; and a receiving unit. The receiving unit receives a Network Controlled HandOver Setup Request Information Element (Ncho Setup Req IE) message indicating that a STAtion (STA) is to perform a scan operation using a controlled scan scheme, from a serving Access Point (AP). The transmitting unit sends a Network Controlled HandOver Setup Response Information Element (Ncho Setup Rsp IE) message including a scan parameter related to a controlled scan operation of the STA, to the serving AP.

Advantageous Effects of Invention

As is apparent from the foregoing description, the present invention may make it possible to minimize the delay time required to determine to perform handover in a radio LAN communication system.

The present invention may make it possible to minimize the packet delay time due to the execution of handover in a radio LAN communication system.

The present invention may make it possible to minimize the decrease in data throughput due to the execution of handover in a radio LAN communication system.

The present invention may make it possible to perform handover by determining whether a target AP can accommodate an STA, in a radio LAN communication system.

The present invention may make it possible to perform handover by allowing an AP to determine a handover start time of an STA in a radio LAN communication system.

BRIEF DESCRIPTION OF DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

MODE FOR THE INVENTION

Preferred embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

The present invention provides an apparatus and method for performing handover in a radio Local Access Network (LAN) communication system.

The present invention provides a handover apparatus and method for minimizing the delay time required to determine to perform handover in a radio LAN communication system.

The present invention provides a handover apparatus and method for minimizing the packet delay time due to the execution of handover in a radio LAN communication system.

The present invention provides a handover apparatus and method for minimizing the decrease in data throughput due to the execution of handover in a radio LAN communication system.

The present invention provides a handover apparatus and method capable of determining whether a target Access Point (AP) can accommodate a STAtion (STA), in a radio LAN communication system.

The present invention provides a handover apparatus and method for allowing an AP to determine a handover start time of an STA in a radio LAN communication system.

Figure 1:
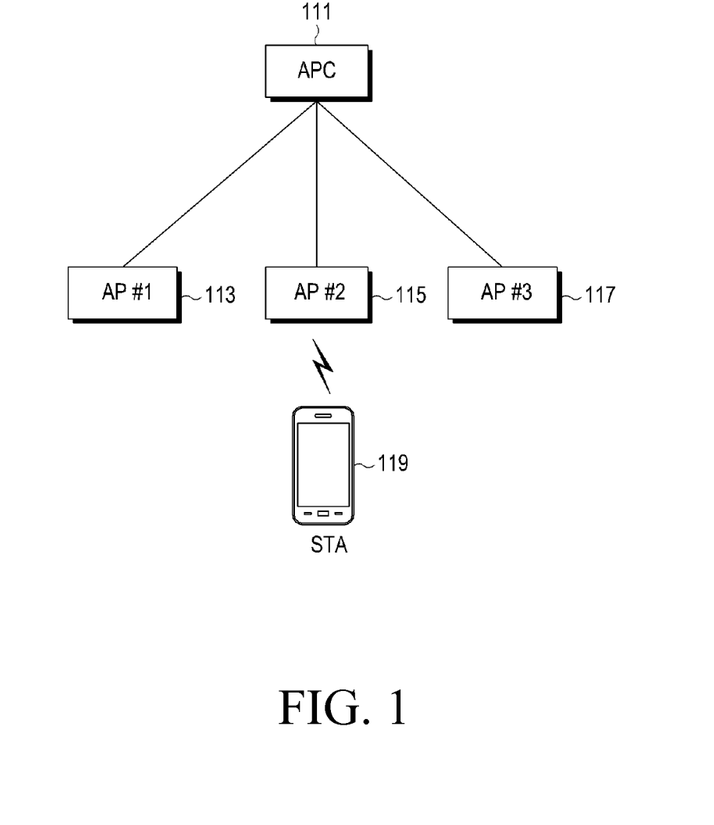
FIG. 1 schematically illustrates a configuration of a radio LAN communication system according to an embodiment of the present invention.

FIG. 1 schematically illustrates a configuration of a radio LAN communication system according to an embodiment of the present invention.

Referring to FIG. 1, the radio LAC communication system includes an Access Point Controller (APC) 111, a plurality of APs (for example, an AP#1 113, an AP#2 115 and an AP#3 117), and an STA 119. The AP#2 115 will be assumed to be a serving AP of the STA 119.

The STA 119 broadcasts a probe request message over an arbitrary channel. Upon receiving the probe request message that the STA 119 broadcasted over the arbitrary channel, each of the AP#1 113, the AP#2 115 and the AP#3 117 measures a Received Signal Strength Indicator (RSSI) of the received probe request message, and then transmits the measured RSSI to the APC 111. In an embodiment of the present invention, even though each of the AP#1 113, the AP#2 115 and the AP#3 117 receives a probe request message from the STA 119, it does not send a probe response message to the STA 119, unlike in the existing radio LAN communication system.

The APC 111 selects a target AP, to which the STA 119 will perform handover, using RSSIs received from the AP#1 113 and the AP#3 117, and commands the STA 119 to perform handover to the selected target AP. In FIG. 1, the AP#3 117 will be assumed to be a target AP.

Now, reference will be made to FIGS. 2*a* and 2*b* to describe a process of performing handover in a radio LAN communication system according to an embodiment of the present invention.

Figure 2A:
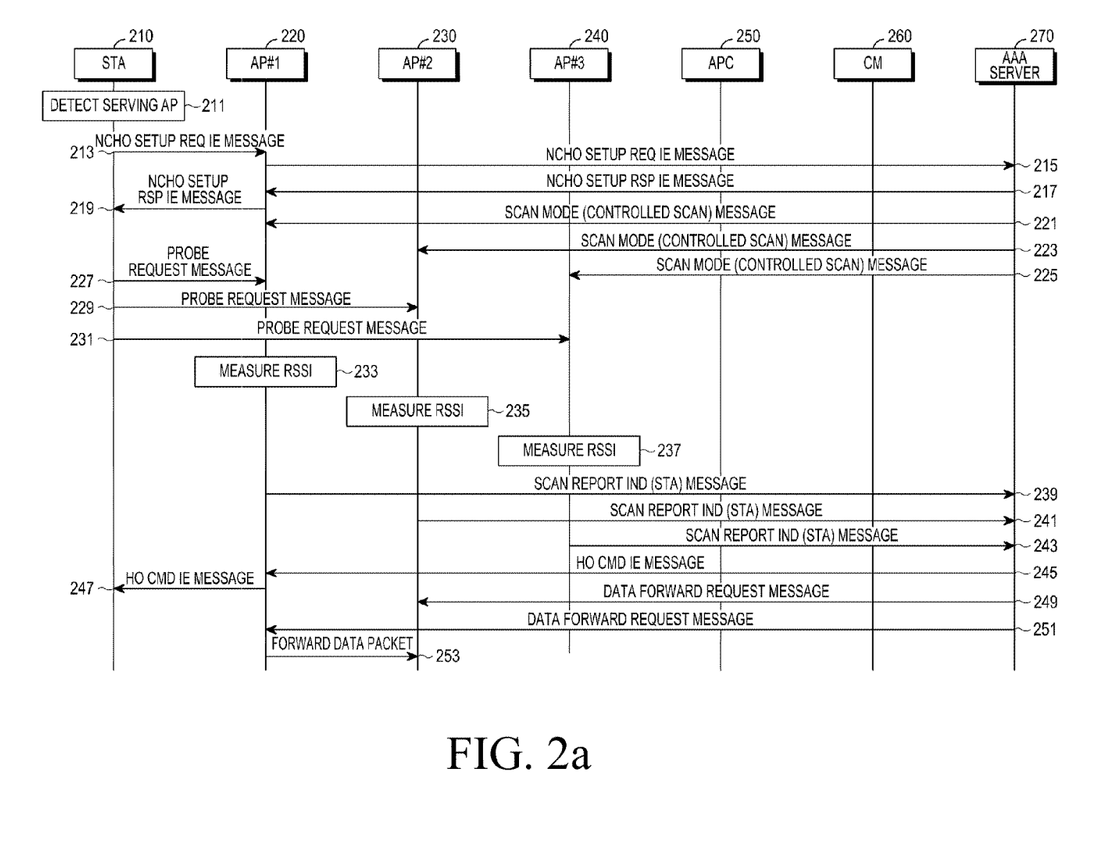
FIGS. 2a and 2b are signaling diagrams illustrating a process of performing handover in a radio LAN communication system according to an embodiment of the present invention.
Figure 2B:
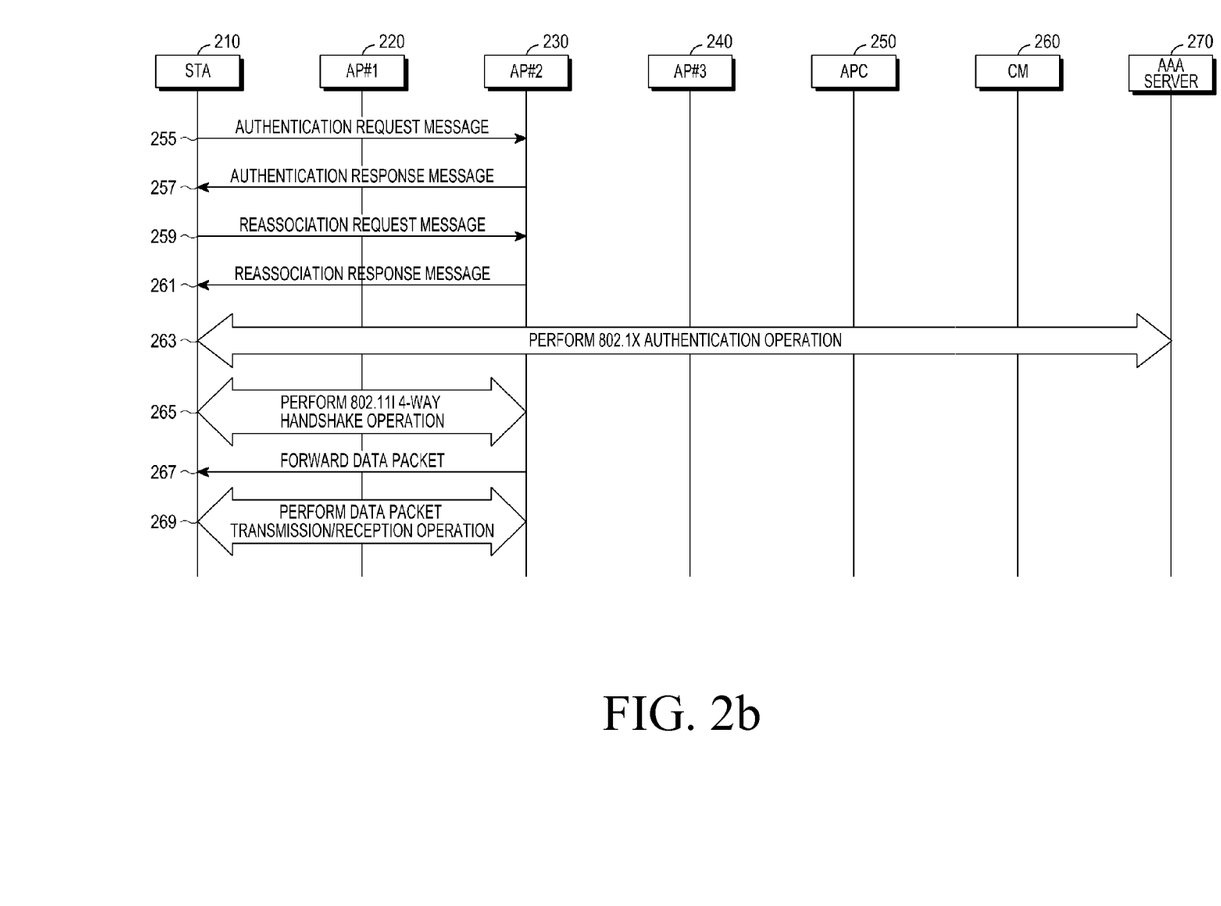

FIGS. 2*a* and 2*b* are signaling diagrams illustrating a process of performing handover in a radio LAN communication system according to an embodiment of the present invention.

Referring to FIGS. 2*a* and 2*b*, an STA 210 supporting a controlled scan operation detects an AP#1 220 (i.e., a serving AP), to which it is presently connected, in step 211, and sends an Ncho Setup Req IE message to the AP#1 220 in steps 213 and 215. The Ncho Setup Req IE represents a Network Controlled HandOver Setup Request Information Element (NCHO Setup Req IE), and a format of the Ncho Setup Req IE is as shown in FIG. 3.

Figure 3:
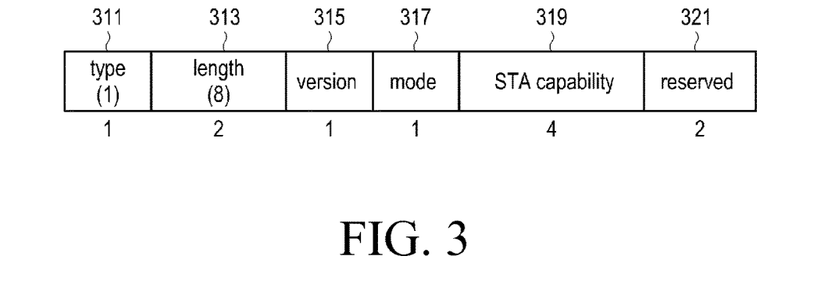
FIG. 3 illustrates a format of an Ncho Setup Req IE according to an embodiment of the present invention.

FIG. 3 illustrates a format of an Ncho Setup Req IE according to an embodiment of the present invention.

Referring to FIG. 3, the Ncho Setup Req IE is an IE for notifying that an STA sending the Ncho Setup Req IE is an STA supporting handover based on the controlled scan scheme. The Ncho Setup Req IE includes a type field 311, a length field 313, a version field 315, a mode field 317, an STA capability field 319, and a reserved field 321.

The type field 311 is a field indicating a type of the IE, i.e., a field indicating that a type of the IE is the Ncho Setup Req IE. The length field 313 is a field indicating a length of the Ncho Setup Req IE. The version field 315 is a field indicating version information of the controlled scan scheme in which the STA operates. The mode field 317 is a field indicating whether the STA sent the Ncho Setup Req IE right after it was connected, or whether the STA sent the Ncho Setup Req IE message when starting a VoIP call. The STA capability field 319 is a field indicating whether the STA supports the mode corresponding to the mode field 317. A field value of the mode field 317 may be implemented with, for example, 1 bit. If the field value is, for example, '0', it indicates that the STA sent the Ncho Setup Req IE right after it was connected to the AP. On the other hand, if the field value is, for example, '1', it indicates that the STA sent the Ncho Setup Req IE message when starting a VoIP call.

The reserved field 321 is a field reserved for its future use.

An Ncho Setup Rsp IE message, a response message to the Ncho Setup Req IE message, is sent from an APC 250 to the STA 210 via the AP#1 220 in steps 217 and 219. The Ncho Setup Rsp IE represents a Network Controlled HandOver Setup Response Information Element (NCHO Setup Rsp IE), and a format of the Ncho Setup Rsp IE is as shown in FIG. 4.

Figure 4:
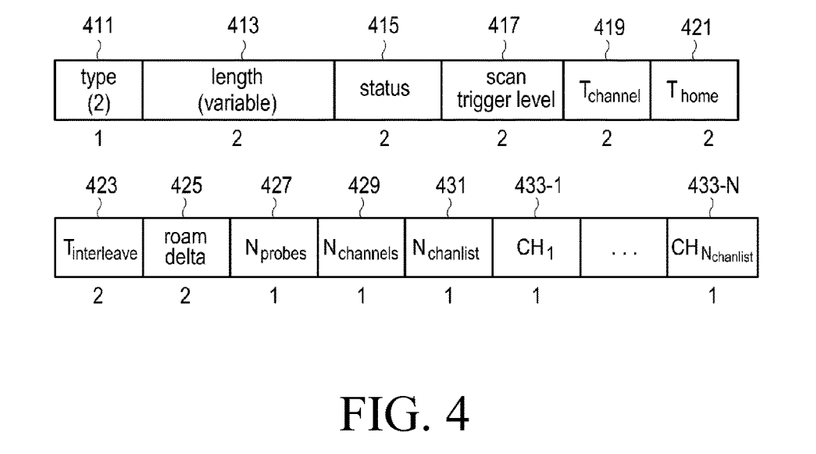
FIG. 4 illustrates a format of an Ncho Setup Rsp IE according to an embodiment of the present invention.

FIG. 4 illustrates a format of an Ncho Setup Rsp IE according to an embodiment of the present invention.

Referring to FIG. 4, the Ncho Setup Rsp IE is an IE for a response to the Ncho Setup Req IE. The Ncho Setup Rsp IE includes a type field 411, a length field 413, a status field 415, a scan trigger level field 417, a scan channel time Tchannel field 419, a scan home time Thome field 421, a scan interleave time Tinterleave field 423, a roam delta field 425, an Nprobes field 427, an Nchannels field 429, an Nchanlist field 431, and a CH1 field 433-1 to a CHN field 433-N. The type field 411 is a field indicating a type of the IE, i.e., a field indicating that a type of the IE is the Ncho Setup Rsp IE. The length field 413 is a field indicating a length of the Ncho Setup Rsp IE. The status field 415 is a field indicating the success/failure of the Ncho Setup Req IE, and may be implemented with, for example, 16 bits. If a field value of the status field 415 is, for example, '0', it indicates that the Ncho Setup Req IE message was successfully handled. If its field value is, for example, '1', it indicates that the AP or the APC does not support the controlled scan scheme. If its field value is, for example, '65535', it indicates that handling of the Ncho Setup Req IE message is failed. The scan trigger level field 417 is a field indicating a level of RSSIscan_trigger, which is a scan operation reference at which the STA will start performing the scan operation. The scan channel time Tchannel field 419 indicates a time for which the STA scans one channel, and its unit may be, for example, [msec]. The scan home time Thome field 421 indicates a time for which the STA exchanges data with the serving AP during the scan interval, and its unit may be, for example, [msec]. The scan interval is set as a value determined by multiplying the time written in the scan channel time Tchannel field 419 by the number of channels, which is written in the Nchannels field 429. The Nchannels field 429 indicates the number of channels which are continuously scanned in one scan interval.

The scan interleave time Tinterleave field 423 indicates an idle time until the STA performs the next scan operation after it scanned all of CH1 to CHN, and its unit may be, for example, [msec]. The roam delta field 425 indicates a signal difference between the serving AP and the target AP, at which the STA attempts handover using the existing active scan operation method, and its unit may be, for example, [dB]. Channel numbers for CH1 to CHN are written in the CH1 field 433-1 to the CHN field 433-N, respectively. The Nprobes field 427 is a field indicating the number of times the STA sends a probe request message when performing a scan operation for one channel. The Nchanlist field 431 indicates the number of channels that the STA will scan to perform handover.

After sending the Ncho Setup Rsp IE message to the STA 210, the APC 250 sends a Scan Mode (controlled scan) message to the serving AP (i.e., AP#1 220) and its neighbor APs 230 and 240 to serving APs 230 and 240 in steps 221, 223 and 225. The Scan Mode (controlled scan) message is a message indicating that the STA 210 will use the controlled scan scheme, and upon receiving the Scan Mode (controlled scan) message, the APs 220, 230 and 240 may send no probe response message to the STA 210 even though they receive a probe request message from the STA 210, and may send, upon receiving a probe request message from the STA 210, an RSSI of the received probe request message to the APC 250. The Scan Mode (controlled scan) message includes a STAtion IDentifier (STAID) for the STA 210.

Upon receiving the Ncho Setup Rsp IE message, the STA 210 broadcasts a probe request message to the APs 220, 230 and 240 according to a field value of the Nprobes field included in the Ncho Setup Rsp IE in steps 227, 229 and 231. In FIGS. 2a and 2b, the field value of the Nprobes field is assumed to be '2', so the STA 210 broadcasts the probe request message two times.

The APs 220, 230 and 240 each measure an RSSI for the probe request message received from the STA 210 in steps 233, 235 and 237, and send a Scan Report Ind (STA) message for reporting their measured RSSI, to the APC 250 in steps 239, 241 and 243. The Scan Report Ind (STA) message includes an STAID of the STA, an RSSI, and an AP IDentifier (APID) of the AP.

If their transmission power is not the maximum value, the APs 220, 230 and 240 each estimate a value determined by multiplying it by a transmission power reduction ratio RTxPower of 0? 1.0 for the AP, as a value obtained when the STA 210 directly measures an RSSI of the AP. Specifically, received signal strength RSSI (STAVoIP, APX) of the STA 210 for the AP is RSSISTA_X×RTxPower. In the RSSI (STAVoIP, APX), STAVoIP represents the STA 210, and APX represents the AP.

Upon receiving the Scan Report Ind (STA) message from each of the APs 220, 230 and 240, the APC 250 determines a target AP to which the STA 210 will perform handover, using the information included in the Scan Report Ind (STA) message, and sends a HO cmd IE message for commanding to perform handover to the target AP (i.e., AP#2 230) to the STA 210 via the AP#1 220 in steps 245 and 247. Since the APC 250 is monitoring the CPU/memory utilization, the number of connected STAs, the amount of data traffic and the number of VoIP calls for each AP to manage states of the APs 220, 230 and 240, the APC 250 may determine an AP with the smaller number of VoIP calls and the low memory utilization among the APs having a good RSSI, as a target AP to which the STA 210 will perform handover.

Figure 5:
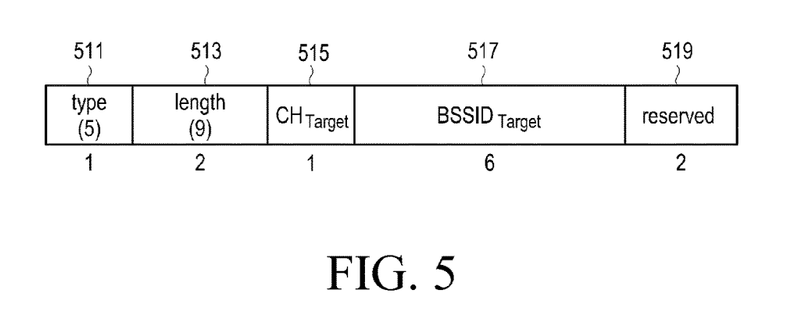
FIG. 5 illustrates a format of a HO cmd IE according to an embodiment of the present invention.

The HO cmd IE is a HandOver command Information Element (HO cmd IE), and a format of the HO cmd IE is as shown in FIG. 5.

FIG. 5 illustrates a format of a HO cmd IE according to an embodiment of the present invention.

Referring to FIG. 5, the HO cmd IE is an IE for notifying information about the AP (i.e., target AP) to which the STA will perform handover. The HO cmd IE includes a type field 511, a length field 513, a CHTarget field 515, a BSSIDTarget field 517, and a reserved field 519. The type field 511 is a field indicating a type of the IE, i.e., a field indicating that a type of the IE is the HO cmd IE. The length field 513 is a field indicating a length of the HO cmd IE. The CHTarget field 515 is a field indicating a channel number of the target AP to which the STA will perform handover. The BSSIDTarget field 517 indicates a Basic Service Set Identifier (BSSID) of the target AP to which the STA will perform handover. The reserved field 519 is a field reserved for its future use.

After sending the HO cmd IE message, the APC 250 starts forwarding a data packet of the STA 210, which is received at the serving AP or the AP#1 220, not only to the AP#1 220 but also to the target AP or the AP#2 230. Specifically, the APC 250 send a Data Forward Request message to each of the AP#1 220 and the AP#2 230 in steps 249 and 251. The Data Forward Request message in step 249 includes 'STA' and 'Target'. 'STA' indicates the STA that receives the forwarded data packet, and 'Target' indicates that an AP receiving the Data Forward Request message is a target AP. The Data Forward Request message in step 251 includes 'STA' and 'Source'. 'STA' indicates the STA that receives the forwarded data packet, and 'Source' indicates that an AP receiving the Data Forward Request message is a serving AP. Therefore, data forwarding is achieved from the serving AP to the target AP.

The AP#1 220 forwards the data packet forwarded from the APC 250 to the AP#2 230, targeting the STA 210 in step 253.

Although not separately illustrated in FIGS. 2a and 2b, the APC 250 commands each of the APs 220, 230 and 240 to operate using the existing active scan scheme instead of the controlled scan scheme, for the STA 210. The reason why the APC 250 commands each of the APs 220, 230 and 240 to operate using the existing active scan scheme for the STA 210 is to prepare for the case where the STA 210 attempts reassociation (or reconnection) as the wireless connection is broken due to its failure in handover to the AP#2 230. Specifically, the STA 210 sends a probe request message when attempting reassociation due to the break of the wireless connection since it performs a channel scan operation using the active scan scheme, so each of the APs 220, 230 and 240 needs to operate using the active scan scheme in order to send a probe response message, a response message to the probe request message.

Upon receiving the HO cmd IE message, the STA 210 sends an authentication request message for requesting authentication for the STA 210, to the AP#2 230 in step 255. Upon receiving the authentication request message, the AP#2 230 performs an authentication operation for the STA 210, and sends an authentication response message to the STA 210 according to the authentication results in step 257.

Upon receiving the authentication response message from the AP#2 230, the STA 210 sends a reassociation request message for requesting reassociation to the AP#2 230 in step 259. Upon receiving the reassociation request message from the STA 210, the AP#2 230 sends a reassociation response message, a response message to the reassociation request message, to the STA 210 in step 261.

Upon receiving the reassociation response message from the AP#2 230, the STA 210 performs an 802.1x Authentication operation with an Authorization, Authentication and Accounting (AAA) server 270 through the AP#2 230 in step 263. After completing the 802.1x Authentication operation, the STA 210 performs an 802.11i 4-way Handshake operation with the AP#2 230 in step 265.

After performing the 802.11i 4-way Handshake operation, the AP#2 230 forwards a data packet to the STA 210 in step 267, and then performs a data packet transmission/reception operation with the STA 210 in step 269.

If the STA 210 fails to perform handover to the target AP or the AP#2 230, the wireless connection is broken, so the STA 210 attempts reassociation. In this case, STA 210 broadcasts a probe request message over all channels to search for an accessible AP. Since the APs 220, 230 and 240 are each already set to operate using the existing active scan scheme as described in steps 221 to 225, they send a probe response message to the STA 210 upon receiving the probe request message sent by the STA 210 that has failed the handover, so the STA 210 may re-associate with a specific AP.

If the STA 210 has succeeded in handover to the target AP or the AP#2 230, the APC 250 transmits data packets to the STA 210, starting from the data packet which was forwarded from the serving AP or the AP#1 220 to the target AP or the AP#2 230. Subsequently, the APC 250 transmits the data packets, which were buffered in the AP#2 230 during handover. By transmitting data packets in this way, it is possible to prevent the data packets received in the handover process from being lost or from being changed in their arrival order. The APC 250 compares a scan trigger level value of the serving AP or the AP#1 220 with a scan trigger level value of the target AP or the AP#2 230, and if they are not identical, the APC 250 applies a new appropriate scan trigger level value to the AP#2 230 by sending an Ncho Setup Rsp IE message to the STA 210. In addition, the APC 250 restores the scan operation scheme for the STA 210 of the serving AP and the neighbor APs to the existing active scan operation scheme.

In the case where a mode field of the Ncho Setup Req IE from the STA 210 is a VoIP call mode, if a VoIP call is ended, the APC 250 restores the set value changed by the Ncho Setup Rsp IE to the stored initial value. Upon detecting the end of the VoIP call, the APC 250 restores the scan operation scheme for the STA 210 of the serving AP and neighbor APs to the existing active scan operation scheme.

If its wireless connection with the serving AP is broken, the STA 210 restores the set value changed by the Ncho Setup Rsp IE to the store initial value. Upon detecting that the STA 210 has re-associated with the AP after its wireless connection was broken, the APC 250 restores the scan operation scheme for the STA 210 of the serving AP and neighbor APs to the existing active scan operation scheme.

Next, reference will be made to FIG. 6 to describe an STA's controlled scan process performed in a radio LAN communication system according to an embodiment of the present invention.

Figure 6:
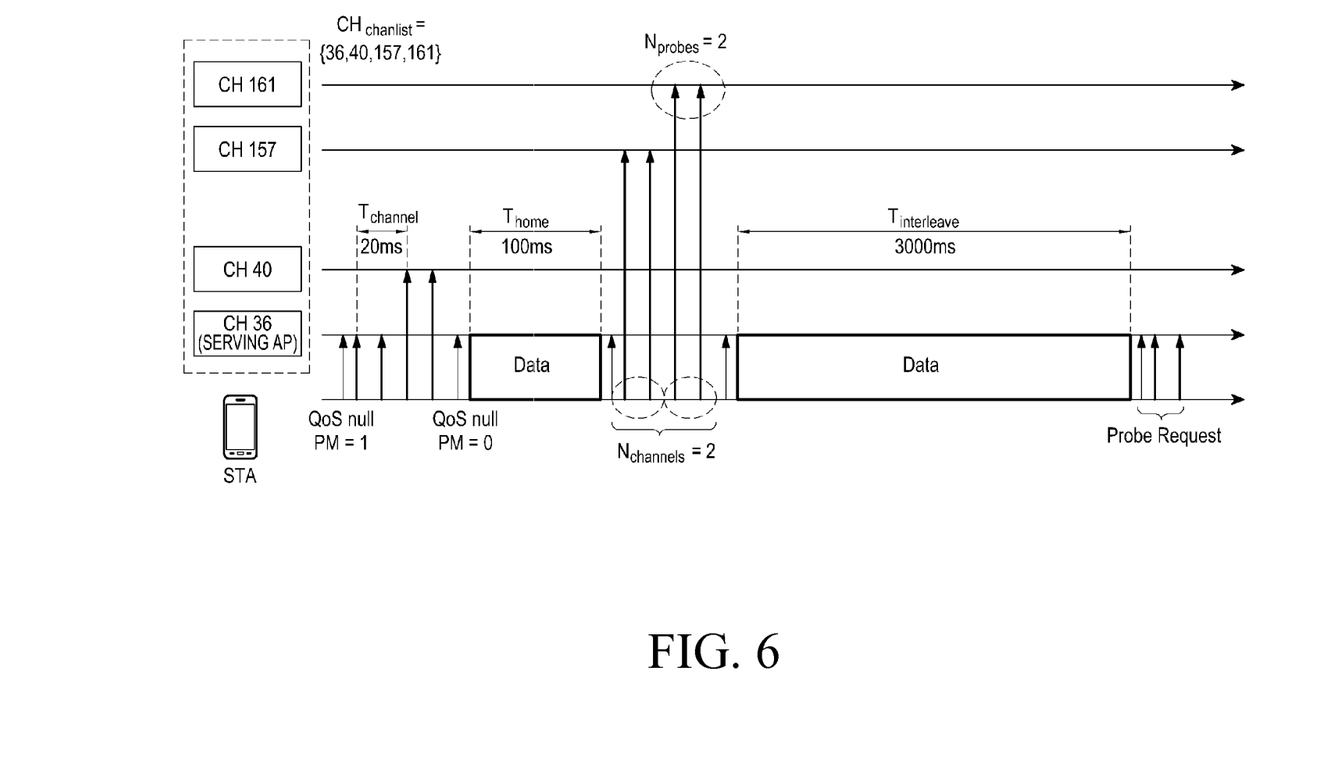
FIG. 6 schematically illustrates an STA's controlled scan process performed in a radio LAN communication system according to an embodiment of the present invention.

FIG. 6 schematically illustrates an STA's controlled scan process performed in a radio LAN communication system according to an embodiment of the present invention.

Referring to FIG. 6, upon receiving an Ncho Setup Rsp IE message, an STA performs a controlled scan operation according to the fields included in the Ncho Setup Rsp IE. Specifically, if a field value of a scan start field included in the Ncho Setup Rsp IE is set to '1' and its other fields are set such that CHchannel_list={36, 40, 157, 161}, Tchannel=20 msec, Thome=100 msec, Tinterleave=3000 msec, Nprobes=2, and Nchannels=2, then the STA sends a probe request message over a channel 36, a channel 40, a channel 157, and a channel 161.

The serving AP and its neighbor APs are also set to operate using the controlled scan scheme. Thus, the serving AP and neighbor APs send no probe response message to the STA even though they receive a probe request message sent by the STA. In addition, the STA sends a Service Set IDentifier (SSID) of the service AP using a probe request message, preventing an arbitrary AP from sending a probe response message to the STA upon receiving the probe request message. In preparation for the occurrence of exceptional situations, the STA may separately store scan operation-related parameters, which were set before the controlled scan operation, when performing the controlled scan operation according to Scan Control IE.

Next, reference will be made to FIG. 7 to describe an internal structure of an STA in a radio LAN communication system according to an embodiment of the present invention.

Figure 7:
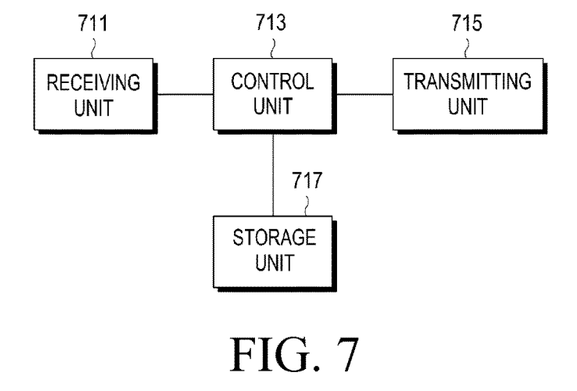
FIG. 7 schematically illustrates an internal structure of an STA in a radio LAN communication system according to an embodiment of the present invention.

FIG. 7 schematically illustrates an internal structure of an STA in a radio LAN communication system according to an embodiment of the present invention.

Referring to FIG. 7, the STA includes a receiving unit 711, a control unit 713, a transmitting unit 715, and a storage unit 717. The control unit 713 controls the overall operation of the STA, especially controls to perform the overall operation related to handover, especially to the controlled scan according to an embodiment of the present invention. The overall operation related to handover has been described with reference to FIGS. 1 to 6, so its detailed description will be omitted herein.

The receiving unit 711 receives various messages from the APC and the APs under control of the control unit 713. The various messages received by the receiving unit 711 have been described with reference to FIGS. 1 to 6, so its detailed description will be omitted herein.

The transmitting unit 715 sends various messages to the APC and the APs under control of the control unit 713. The various messages sent by the transmitting unit 715 have been described with reference to FIGS. 1 to 6, so its detailed description will be omitted herein.

The storage unit 717 stores various messages received by the receiving unit 711 and a variety of data, especially scan operation-related parameters needed for operation of the STA.

Although the receiving unit 711, the control unit 713, the transmitting unit 715, and the storage unit 717 are implemented as separate units in FIG. 7 by way of example, it will be apparent to those of ordinary skill in the art that they may be implemented as a single unit.

Next, reference will be made to FIG. 8 to describe an internal structure of an AP in a radio LAN communication system according to an embodiment of the present invention.

Figure 8:
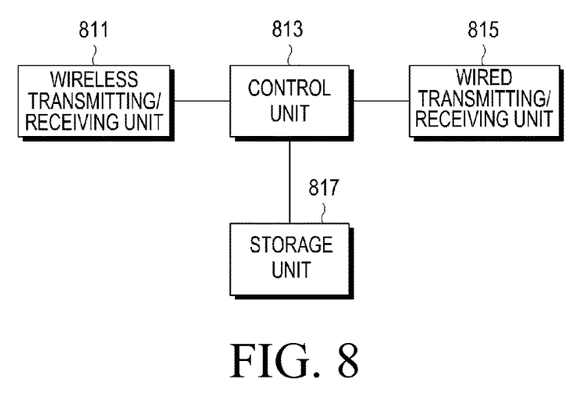
FIG. 8 schematically illustrates an internal structure of an AP in a radio LAN communication system according to an embodiment of the present invention.

FIG. 8 schematically illustrates an internal structure of an AP in a radio LAN communication system according to an embodiment of the present invention Referring to FIG. 8, the AP includes a wireless transmitting/receiving unit 811, a control unit 813, a wired transmitting/receiving unit 815, and a storage unit 817. The control unit 813 controls the overall operation of the AP, especially controls to perform the overall operation related to handover, especially to the controlled scan according to an embodiment of the present invention. The overall operation related to handover has been described with reference to FIGS. 1 to 6, so its detailed description will be omitted herein.

The wireless transmitting/receiving unit 811 receives various messages from the APC and the STAs under control of the control unit 813. The various messages received by the wireless transmitting/receiving unit 811 have been described with reference to FIGS. 1 to 6, so its detailed description will be omitted herein.

The wired transmitting/receiving unit 815 sends various messages to the APC and the APs under control of the control unit 813. The various messages sent by the wired transmitting/receiving unit 815 have been described with reference to FIGS. 1 to 6, so its detailed description will be omitted herein.

The storage unit 817 stores various messages received by the wireless transmitting/receiving unit 811 and the wired transmitting/receiving unit 815, and a variety of data, especially scan operation-related parameters needed for operation of the AP.

Although the wireless transmitting/receiving unit 811, the control unit 813, the wired transmitting/receiving unit 815, and the storage unit 817 are implemented as separate units in FIG. 8 by way of example, it will be apparent to those of ordinary skill in the art that they may be implemented as a single unit.

Next, reference will be made to FIG. 9 to describe an internal structure of an APC in a radio LAN communication system according to an embodiment of the present invention.

Figure 9:
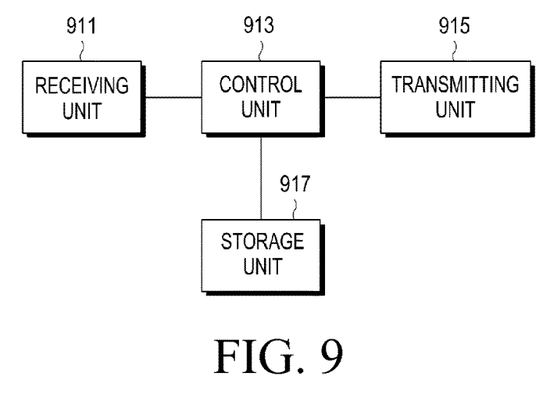
FIG. 9 schematically illustrates an internal structure of an APC in a radio LAN communication system according to an embodiment of the present invention.

FIG. 9 schematically illustrates an internal structure of an APC in a radio LAN communication system according to an embodiment of the present invention.

Referring to FIG. 9, the APC includes a receiving unit 911, a control unit 913, a transmitting unit 915, and a storage unit 917. The control unit 913 controls the overall operation of the APC, especially controls to perform the overall operation related to handover, especially to the controlled scan according to an embodiment of the present invention. The overall operation related to handover has been described with reference to FIGS. 1 to 6, so its detailed description will be omitted herein.

The receiving unit 911 receives various messages from the AP and the STA under control of the control unit 913. The various messages received by the receiving unit 911 have been described with reference to FIGS. 1 to 6, so its detailed description will be omitted herein.

The transmitting unit 915 sends various messages to the AP and the STA under control of the control unit 913. The various messages sent by the transmitting unit 915 have been described with reference to FIGS. 1 to 6, so its detailed description will be omitted herein.

The storage unit 917 stores various messages received by the receiving unit 911 and a variety of data, especially scan operation-related parameters needed for operation of the APC.

Although the receiving unit 911, the control unit 913, the transmitting unit 915, and the storage unit 917 are implemented as separate units in FIG. 9 by way of example, it will be apparent to those of ordinary skill in the art that they may be implemented as a single unit.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for performing handover by a station (STA) in a communication system, the method comprising:
   transmitting a first message, indicating that the STA is to perform a scan operation, to a first access point (AP) serving to the STA;
   receiving a second message, including at least one scan parameter related to the scan operation, from the first AP;
   transmitting a probe request message, to the first AP and at least one other AP, based on the at least one scan parameter;
   receiving a third message, including information on a second AP, from the first AP; and
   performing handover to the second AP,
   wherein the at least one scan parameter comprises a channel list indicating channels of neighboring APs to which the STA is capable to perform a handover,
   wherein the probe request message is transmitted through the channels indicated by the channel list, and
   wherein the second AP is determined by an access point controller (APC).

2. The method of claim 1, further comprising:
   not receiving a probe response message from the first AP and the at least one other AP.

3. The method of claim 1,
   wherein the at least one scan parameter further includes at least one of a scan trigger level, a scan channel time, a scan home time, a scan interleave time, and a road delta.

4. A method for supporting handover of a station (STA) by an access point (AP) in a communication system, the method comprising:
   receiving a first message, indicating that the STA is to perform a scan operation, from the STA;
   transmitting a second message, corresponding to the first message, to an access point controller (APC);

receiving a third message, including at least one scan parameter, from the APC;
transmitting a fourth message, corresponding to the third message, to the STA;
receiving a probe request message from the STA;
measuring a received signal strength indicator (RSSI);
transmitting information on the RSSI and an identifier of the STA to the APC;
receiving information on another AP from the APC; and
transmitting information on the another AP to the STA,
wherein the at least one scan parameter comprises a channel list indicating channels of neighboring APs to which the STA is capable to perform a handover,
wherein the probe request message is transmitted through the channels indicated by the channel list, and
wherein the another AP is determined by the APC.

5. The method of claim 4, further comprising:
not transmitting a probe response message to the STA.

6. The method of claim 4,
wherein the third message further includes the identifier of the STA from the APC.

7. The method of claim 4,
wherein the at least one scan parameter includes at least one of a scan trigger level, a scan channel time, a scan home time, a scan interleave time, and a road delta.

8. A method for supporting handover of a station (STA) by an access point controller (APC) in a communication system, the method comprising:
receiving a first message, indicating that the STA is to perform a scan operation, from a first access point (AP);
transmitting a second message, including at least scan parameter, to a plurality of APs including the first AP;
receiving information, on a plurality of received signal strength indicators (RSSIs) of the plurality of APs, from the plurality of APs;
determining one AP, of the plurality of APs, based on the received information on the plurality of RSSIs; and
transmitting a message, indicating the STA performs handover to the determined one AP, to the first AP,
wherein the at least one scan parameter comprises a channel list indicating channels of neighboring APs to which the STA is capable to perform a handover, and
wherein the probe request message is transmitted through the channels indicated by the channel list.

9. The method of claim 8, further comprising:
monitoring status of the plurality of APs; and
determining the one AP, of the plurality of APs, based on the monitored status of the plurality of APs.

10. The method of claim 8,
wherein the at least one scan parameter includes at least one of a scan trigger level, a scan channel time, a scan home time, a scan interleave time, and a road delta.

11. A station (STA) in a communication system, the STA comprising:
a transmitting unit;
a receiving unit; and
at least one processor,
wherein the transmitting unit is configured to:
transmit a first message, indicating that the STA is to perform a scan operation, to a first access point (AP) serving to the STA, and
transmit a probe request message, to the first AP and at least one other AP, based on at least one scan parameter,
wherein the receiving unit is configured to:
receive a second message, including the at least one scan parameter related to the scan operation, from the first AP, and
receive a third message, including information on a second AP, from the first AP,
wherein the at least one processor is configured to perform handover to the second AP,
wherein the at least one scan parameter comprises a channel list indicating channels of neighboring APs to which the STA is capable to perform a handover,
wherein the probe request message is transmitted through the channels indicated by the channel list, and
wherein the second AP is determined by an access point controller (APC).

12. The STA of claim 11,
wherein the receiving unit is configured to not receive a probe response message from the first AP and the at least one other AP.

13. The STA of claim 11,
wherein the at least one scan parameter includes at least one of a scan trigger level, a scan channel time, a scan home time, a scan interleave time, and a road delta.

14. An access point (AP) in a communication system, the AP comprising:
a transmitting unit;
a receiving unit; and
at least one processor,
wherein the receiving unit is configured to:
receive a first message, indicating that a station (STA) is to perform a scan operation, from the STA,
receive a third message, including at least one scan parameter, from an access point controller (APC),
receive a probe request message from the STA, and
receive information on another AP from the APC,
wherein the transmitting unit is configured to:
transmit a second message, corresponding to the first message, to the APC,
transmit a fourth message, corresponding to the third message, to the STA,
transmit information, on a received signal strength indicator (RSSI) and an identifier of the STA, to the APC, and
transmit information on the another AP to the STA,
wherein the at least one processor is configured to measure the RSSI,
wherein the at least one scan parameter comprises a channel list indicating channels of neighboring APs to which the STA is capable to perform a handover,
wherein the probe request message is transmitted through the channels indicated by the channel list, and
wherein the another AP is determined by the APC.

15. The AP of claim 14,
wherein the transmitting unit is further configured to not transmit a probe response message to the STA.

16. The AP of claim 14,
wherein the third message further includes the identifier of the STA from the APC.

17. The AP of claim 14,
wherein the at least one scan parameter includes at least one of a scan trigger level, a scan channel time, a scan home time, a scan interleave time, and a road delta.

18. An access point controller (APC) in a communication system, the APC comprising:
a transmitting unit;
a receiving unit; and
at least one processor,
wherein the receiving unit is configured to:

receive a first message, indicating that a station (STA) is to perform a scan operation, from a first access point (AP) of a plurality of APs, and receive information, on a plurality of received signal strength indicators (RSSIs) of the plurality of APs, from the plurality of APs, wherein the transmitting unit is configured to:

transmit a second message, including at least scan parameter, to the plurality of APs including the first AP, and transmit a message, indicating the STA performs handover to a determined one AP, to the first AP, wherein the at least one scan parameter comprises a channel list indicating channels of neighboring APs to which the STA is capable to perform a handover, wherein the probe request message is transmitted through the channels indicated by the channel list, and wherein the at least one processor is configured to determine the one AP of the plurality of APs based on the received information on the plurality of RSSIs.

19. The APC of claim 18, wherein the at least one processor is further configured to:

monitor status of the plurality of APs, and determine the one AP of the plurality of APs based on the monitored status of the plurality of APs.

20. The APC of claim 18, wherein the at least one scan parameter includes at least one of a scan trigger level, a scan channel time, a scan home time, a scan interleave time, and a road delta.

* * * * *